April 21, 1936.    H. E. WARREN    2,038,396
NON-SELF-STARTING SYNCHRONOUS MOTOR
Filed Dec. 14, 1933

Inventor:
Henry E. Warren,
by Harry E. Dunham
His Attorney.

Patented Apr. 21, 1936

2,038,396

UNITED STATES PATENT OFFICE 2,038,396

NON-SELF-STARTING SYNCHRONOUS MOTOR

Henry E. Warren, Ashland, Mass., assignor to Warren Telechron Company, Ashland, Mass., a corporation of Maine Application December 14, 1933, Serial No. 702,347

7 Claims. (Cl. 172—275)

My invention relates to electric motors and in particular to nonself-starting synchronous reluctance motors suitable for use in driving timing devices.

The main object of my invention is to provide a motor of the above mentioned type with an inexpensive arrangement for permitting the normally stationary member to oscillate sufficiently to assure the establishment of synchronism when the motor is started and to prevent the motor from easily falling out of step upon the occurrence of sudden loads, changes in frequency, and the like.

A motor of the type for which the invention is primarily intended is usually started by giving the rotor thereof a spin to bring it up to a speed slightly above the synchronous speed and then allowing the rotor to decelerate to the synchronous speed where, if conditions are favorable, the rotor will fall into synchronism. In the present invention, the conditions favorable to the establishment of synchronism are assured by reason of the fact that the normally stationary element of the motor is so mounted that it may rotate in either direction by an amount sufficient to have its salient poles align with the poles in the rotating element coincident with one or more flux pulsations when the rotor is near synchronous speed. In one form of my invention, the normally stationary element may be rotated without limitation and synchronism may be established regardless of the actual speed of the rotor by reason of the fact that either or both of the motor elements may be rotated. This arrangement has certain other advantages to be referred to later but, for synchronizing purposes, it is sufficient to spin the rotor element only and allow the normally stationary element to make the necessary slight rotational adjustment to establish synchronism.

Figure 3:
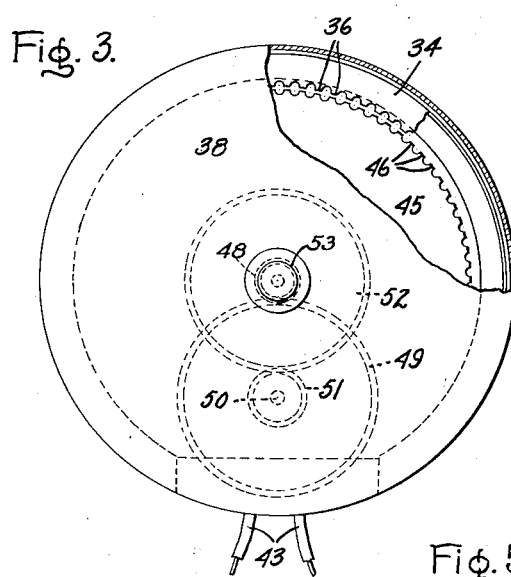
Figure 4:
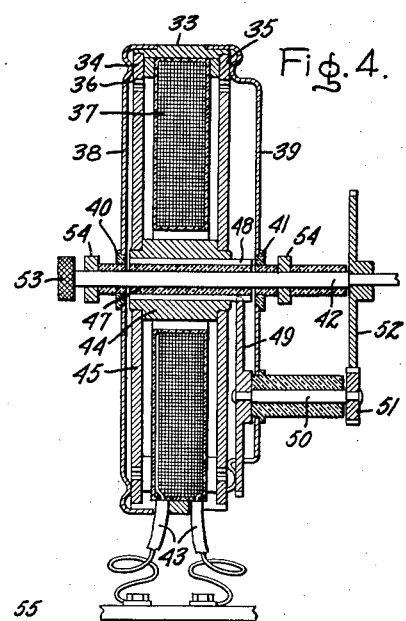
Figure 5:
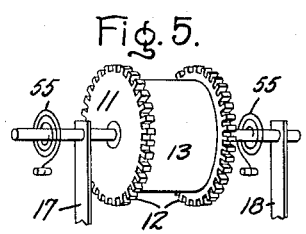

The features of my invention, which are believed to be novel and patentable, will be pointed out in the claims appended hereto. For a better understanding of my invention, reference is made in the following description to the accompanying drawing, Figs. 1 and 2 of which illustrate end and sectional side views of a form of my invention where the normally stationary primary element is inside the secondary rotor and may be rotated in either direction by reason of its being mounted on trunnions which serve also to convey the single phase energy to the stator winding. Figs. 3 and 4 show end and sectional side views of a form of the invention where the stator is outside the rotor and is limited in the amount to which it can be rotated by reason of the flexible current leads thereto, and Fig. 5 represents a modification of the support for the form of stator shown in Fig. 2 for high torque loads.

Figure 2:
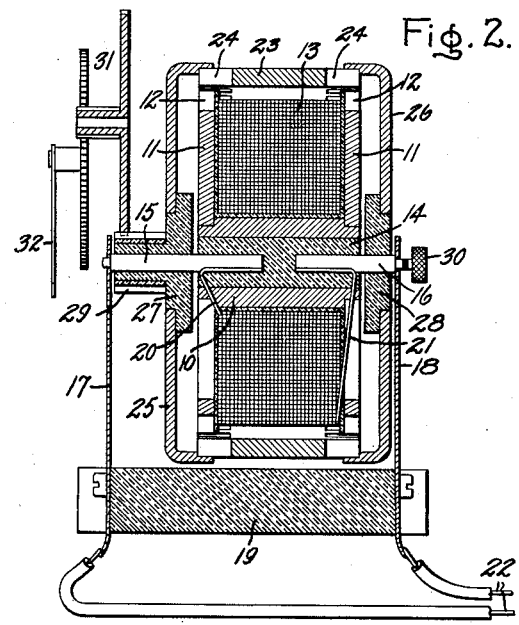

Referring now to Fig. 2, I have represented a synchronous motor of the salient pole reluctance type. The normally stationary part, which will be referred to as the stator, has a magnetic circuit which comprises a hollow steel core 10 with circular steel disc shaped side wall pieces 11 at either end, the outer peripheries of which are notched to form salient poles 12. This magnetic circuit is energized by the coil 13 which surrounds the core 10 and occupies the space between the wall plates 11. Fitted within the core hub 10 is an insulating rod 14, and secured in the insulating rod and extending axially from either end are circular metallic shaft members 15 and 16. These shaft members have reduced sections supported in corresponding openings in metallic trunnions 17 and 18 extending from an insulated supporting block 19, and the arrangement thus serves to rotatively support the stator member at its center. Leads 20 and 21 connect the shaft members 15 and 16 to the two ends of the single phase energizing coil 13 so that the motor may be energized by connecting the source of supply 22 across the two trunnions 17 and 18 as represented. The trunnions are of resilient material and are tensioned slightly to produce an inward end pressure on the stepped portions of the shaft members 15 and 16 so that, under normal synchronous operating conditions, sufficient friction is encountered to keep the stator element from rotating.

The rotor member has an outer cylindrical steel member 23, having teeth 24 cut in its opposite ends adjacent to and spaced from the teeth 12 in the side walls of the stator. The salient pole rotor member 23 is supported on a non-magnetic spider consisting of side pieces 25 and 26 which, in turn, are supported on axial bearings 27 and 28 rotatively supported on the normally stationary shaft members 15 and 16 between the trunnions and the stator. I have found that the bearing members 27 and 28 may be made of oil impregnated wood with satisfactory results. This insulates the end shields 26 from the conductor shaft extensions 15 and 16. The bearing member 27 has an axial extension which carries a pinion 29 for conveying the rotation of the rotor to the clock or other mechanism to be driven.

When single-phase energy is supplied at 22, the current is conveyed through the trunnions 17 and 18, shaft members 15 and 16, and leads 20 and 21 to coil 13. An alternating flux is set up between the magnetic parts of stator and rotor as follows:—through core 10, side piece 11, teeth 12, across the narrow radial air gap to teeth 24, across part 23 to the teeth on the opposite end and returning to the stator through side piece 11. Such a motor is not self-starting but, if the parts have relative rotation at a speed where the teeth in stator and rotor come opposite each other in synchronism with the flux pulsations, the motor will develop a synchronous torque at such speed and may be used for driving light loads such, for example, as synchronous clocks and analogous devices.

Such a motor may be started by placing the finger on the outer shell of the part 23 and giving the rotor a spin in the direction in which rotation is desired to bring the rotor up to or slightly above synchronous speed with the field excited.

Since the stator may rotate against a slight friction, it will turn one way or the other as necessary to align its teeth with the rotor teeth coincident with a flux pulsation to easily establish synchronism, after which the stator will come to rest and the rotor will drive the load through the pinion 29. The load torque must, of course, be less than the torque necessary to rotate the stator element against the friction at the trunnions if a true synchronous operation of the load is desired but, since a clock load is very small, there is no difficulty in adjusting the stator friction between a value to prevent its rotation under normal conditions and a value which will permit it to turn slightly under the pull in torque conditions which exist at the moment of synchronism. The same arrangement prevents the motor from falling out of step easily due to variations in frequency and sudden changes in load, because the friction torque necessary to turn the stator is less than the synchronous pull out torque of the motor, and a slight rotational movement of the stator occurs under such conditions, effectively preventing the motor from falling out of synchronism. Thus the friction torque necessary to move the stator should be greater than the torque necessary to drive the connected load under normal conditions but less than the synchronizing torque of the motor.

It will be observed that the pancake shaped coil 13 supported by the primary member is substantially incased by the primary and secondary magnetic members which have their two sets of salient pole pieces separated by narrow air gaps concentric to the axis of rotation of the motor. The coil produces an alternating flux in series relation through both of the primary and secondary magnetic members and across the air gap. The parts are supported on the same axis of rotation by electrically insulated bearing members having parts common to both stator and rotor. The arrangement provides an efficient, inexpensive, compact, reluctance motor construction that is easily synchronized.

On the extension of shaft member 16, I have shown an insulated thumb piece 30 secured thereto. Instead of spinning the rotor, I may spin the stator to establish synchronism, in which case, the stator should be spun in the direction opposite to that in which rotation is desired. After synchronism is established, the stator comes to rest as the rotor speeds up. Also, I may spin both rotor and stator in opposite directions until their relative speeds correspond to about the synchronous speed to establish synchronism. It is, however, unnecessary to spin the stator to establish synchronism and the thumb piece 30 is not essential but may be convenient in instances where the construction of which the motor is a part makes it difficult to get at the rotor.

The rotational feature of the stator permits an additional desirable result to be accomplished in that it permits of easy and very accurate setting of the second hand of a clock driven by the motor while the same is in normal operation. To illustrate this feature, I have represented at 31 suitable reduction gearing between the rotor pinion 29 and a second hand 32 of a clock. If the motor has 60 salient poles, the speed at 60 cycles will be 120 R. P. M. and will require a 120 to 1 gear reduction between it and the second hand of the clock. In such a construction, the second hand may be advanced or retarded by manually turning the stator with the thumb piece 30 in one direction or the other. This is done while the device is in normal operation and without danger of getting the motor out of synchronism. In the arrangement described, a complete rotation of the stator corresponds to a three degree movement of the second hand or a correction of one-half second. It is thus evident that the device affords an easy and convenient way of very accurately adjusting the second hand while the motor is in normal operation driving the clock. This feature of the invention is claimed in my divisional application, Serial No. 717,765, filed March 28, 1934.

Figure 1:
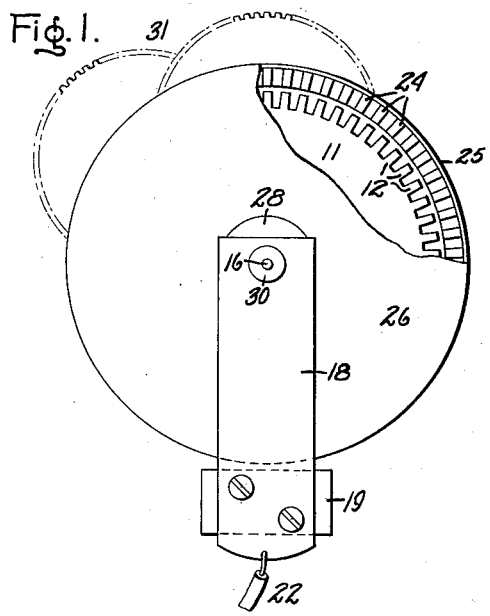

In Figs. 3 and 4, I have represented a nonself-starting synchronous motor of the same general type as is shown in Fig. 1, but with the stator on the outside, and in which the rotation of the stator is limited to a small part of a complete rotation. The stator magnetic circuit comprises the cylindrical steel part 33 having inwardly extending side flanges 34 and 35 which have teeth 36 cut in their inner peripheries. A pancake shaped exciting coil 37 is held within this stator magnetic circuit and extends toward the axis beyond the pole pieces 36. Nonmagnetic side shields 38 and 39 embrace the stator and support the same, and have bearings 40 and 41 which permit the stator to oscillate about the shaft 42. The coil 37 is connected by flexible leads 43 to a suitable board, and these leads are the only thing that prevents unlimited rotation of the stator.

The rotor magnetic circuit partially surrounds the coil 37 and consists of the magnetic hub 44 and side plates 45, the outer peripheries of which have salient pole teeth 46 cut therein and extending in alignment and close proximity to the teeth 36 of the stator. The steel hub 44 is pressed upon a sleeve 47 having a pinion 48 cut therein. Sleeve 47 is preferably secured to shaft 42 and the shaft extended to a spinning knob 53. The parts numbered 54 are stationary trunnion bearing parts.

The rotation of the rotor is transmitted to gear 49 which is secured to a shaft 50 having a bearing extending through and supported in the end shield 39. A pinion 51 is secured to the outer end of shaft 50 and meshes with a gear 52 rotating on shaft 42. Gear 52 leads to the clock or other device to be driven. The arrangement permits slight rotation of the stator without interfering with the gear train drive, and also permits the motor, as a whole, to be mounted concentrically with a clock movement.

To start this motor, the field is energized and the rotor given a spin in the desired direction of rotation to bring it up to about synchronous speed where the pull in torque impulses will rotate the stator slightly to facilitate easy synchronization. The same feature absorbs disturbances that might otherwise throw the motor out of step.

In cases where a considerable load is to be driven, it may be desirable to provide resilient means for resisting rotation of the stator element. An example of this is represented in Fig. 5. Here I have represented a stator element of a motor such as is shown in Figs 1 and 2. Here I do not depend upon the friction in the trunnions to prevent continuous rotation of the stator but, instead, I provide one or more spiral springs 55 secured between stationary abutments and the shaft extensions to resist continuous rotation. These springs tend to bring the stator back to a central rotative position after a turning movement and may also serve to convey current to the stator winding 13.

In all of the modifications, the feature which assists synchronization is the mounting of the normally stationary element so as to permit of a rotational movement thereof at the instant of synchronization. This limited yielding of the stator to the rotational pull of the torque impulses permits easy synchronizing without resorting to auxiliary synchronizing devices and contributes to a low cost and compact motor construction.

Having described the principle of operation of my invention and various ways of carrying it into effect, I seek claims commensurate with the true spirit and scope thereof without limitation as to specific details of construction.

What I claim as new and desire to secure by Letters Patent of the United States is:

1. A synchronous motor of the reluctance type having relatively rotatable primary and secondary magnetic members each provided with two sets of salient pole pieces, the two sets of pole pieces in the primary being separated from the two sets of pole pieces in the secondary by narrow air gaps concentric with the axis of rotation of the motor, a pancake shaped coil supported by the primary member and substantially incased by the primary and secondary magnetic members for producing an alternating flux in series relation in both of said magnetic members and across said air gap, means whereby one of said members may be manually spun when said coil is energized to produce substantially synchronous relative rotation between said members, and bearing means for rotatively supporting both of said members on the same axis of rotation whereby, when one is manually spun to bring it up to approximately synchronous speed, the other may yieldingly rotate in either direction by at least the distance corresponding to one-half the pole spacing of the motor in response to the pull in torque of said motor to assist in synchronizing, and means for preventing continuous rotation of one of said members under normal synchronous operating conditions of said motor.

2. A synchronous motor of the reluctance type having relatively rotatable primary and secondary magnetic members having cooperating salient pole pieces separated by an air gap, a coil on the primary member for producing an alternating flux across the air gap, bearings for rotatively supporting both of said members on the same axis of rotation, means including parts of said bearings for connecting said coil to an alternating current source of supply, and means for yieldingly resisting rotation of one of said members but permitting rotation thereof in response to the pull in torque of said motor to assist in synchronizing said motor when it is started.

3. A synchronous reluctance motor having salient pole primary and secondary magnetic members, a single coil on the primary member for producing an alternating flux between the salient poles of primary and secondary members, bearings for rotatively supporting both of said members on the same axis of rotation, means for conveying current to said coil through said bearings, and means including parts of said bearings for yieldingly resisting rotation of the primary member but permitting rotation thereof in response to the pull in synchronizing torque of said motor to assist in synchronizing said motor when it is started.

4. A synchronous reluctance motor comprising a stator having an axial magnetic core, a coil surrounding said core, disc shaped magnetic side pieces extending radially from the ends of said core on either side of said coil, teeth cut in the peripheries of said side pieces forming radially extending salient pole pieces, metallic shaft parts secured in but insulated from said magnetic core and from each other and extending axially from the opposite ends of said core, metallic trunnions rotatively supporting said shaft parts, conductors between said shaft parts and the terminals of said coil whereby said stator may be energized through said trunnions, a rotor having a cylindrical magnetic part with salient pole teeth cut in opposite ends thereof closely surrounding said stator with the teeth thereof in alignment with the teeth in the stator, and nonmagnetic spider members extending from the opposite ends of the magnetic part of the rotor, enclosing the stator and having electrically insulated bearings on said shaft extensions.

5. A synchronous motor of the reluctance type having a stator and rotor both mounted for rotation about a common axis, a load connected to be driven by said rotor, and friction means for yieldingly resisting rotation of said stator adjusted to such value as to allow momentary rotation of the stator in response to the pull in torque of said motor but to prevent its rotation in response to the normal synchronous load torque of said motor.

6. A synchronous reluctance motor comprising stator and rotor members, the stator having a coil for energizing the motor, means for rotatively mounting both of said members for rotation about a common axis, and means for limiting the rotational mvement of said stator comprising flexible current conducting leads for supplying the coil on said stator.

7. A synchronous reluctance motor comprising an internal rotor and an external stator, a central shaft rotatively supporting both the stator and rotor, end shields enclosing the rotor and extending from the external stator to bearing upon said shaft, means for yieldingly preventing more than a slight angular rotation of said stator, a pinion secured to one end of said rotor within the adjacent end shield and meshing with a gear on a shaft which extends through and is rotatively supported in said end shield parallel to the central shaft, a pinion on the second mentioned shaft outside said end shield and meshing with a gear rotatively mounted on said central shaft whereby limited rotational movements of said stator do not interfere with the driving of said gear train from the rotor of the motor.

HENRY E. WARREN.